(12) United States Patent
Ogawa (10) Patent No.: US 6,447,175 B1
(45) Date of Patent: Sep. 10, 2002

(54) LIGHT SHIELDING BLADE AND METHOD OF MANUFACTURING THE SAME

(75) Inventor: Takao Ogawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 09/552,675

(22) Filed: Apr. 19, 2000

(30) Foreign Application Priority Data

Apr. 21, 1999 (JP) .......................................... 11-113096

(51) Int. Cl.[7] .................................................. G03B 9/40
(52) U.S. Cl. ........................ 396/488; 396/493; 428/480
(58) Field of Search .......................... 430/321; 428/480, 428/482; 396/488, 493; 29/417

(56) References Cited

U.S. PATENT DOCUMENTS

| | | | |
|---|---|---|---|
| 3,675,562 A | | 7/1972 | Sanada et al. |
| 3,682,075 A | | 8/1972 | Profitt |
| 3,942,183 A | * | 3/1976 | Whiteside .................. 396/491 |
| 4,415,251 A | * | 11/1983 | Petersen ..................... 396/491 |
| 5,422,697 A | | 6/1995 | Ichinomiya et al. |

FOREIGN PATENT DOCUMENTS

| | | |
|---|---|---|
| JP | 56-70536 | 6/1981 |
| JP | 64-57247 | 3/1989 |

* cited by examiner

*Primary Examiner*—David M. Gray
(74) *Attorney, Agent, or Firm*—Nixon Peabody LLP; Thomas W. Cole (57) ABSTRACT

A reflection preventing treatment is performed with respect to an edge face of a light shielding blade. The blade is composed of a film material made of a polyester, and is formed into a predetermined shape as a base piece. A flat face portion of the blade is capable of shielding an incident light, and an edge face portion is present in perpendicularly crossing to the flat face portion. An inner edge face of an aperture opening is included in this edge face portion. In order to form the blade, at first the base piece is punched from the film material in a predetermined shape. Subsequently, a chemical etching is applied to the edge face portion of the punched base piece so as to roughen the edge face portion. Accordingly, it is possible to suppress an unnecessary reflection of the incident light at the edge face portion. It is possible to evenly and efficiently roughen the inner edge face of the aperture opening by collecting a multiplicity of punched base pieces and dipping them in an etching solution.

2 Claims, 6 Drawing Sheets

LIGHT SHIELDING BLADE AND METHOD OF MANUFACTURING THE SAME

BACKGROUND OF THE INVENTION

1. Field of the Invention

The present invention relates to a light shielding blade such as a shutter blade and an aperture blade for a camera, and a method of manufacturing the same. In particular, the present invention relates to an edge face treatment of the light shielding blade for the purpose of preventing a harmful reflection.

2. Description of the Prior Art

Figure 5:
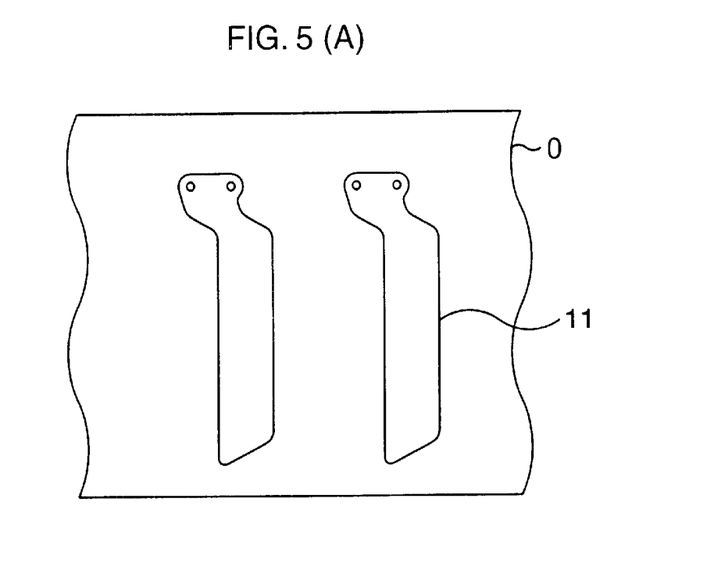
FIGS. 5(A) through 5(C) are a schematic process diagram, which shows a method of manufacturing a light shielding blade in accordance with a conventional art.

FIG. 5 is a process diagram, which shows a method of manufacturing a conventional focal-plane shutter blade. At first, a shutter blade 11 having a predetermined planner shape is punched out from an aluminum foil 0 in step of FIG. 5(A). Subsequently, in step of FIG. 5(B), an alumite treatment is applied to a major face 11S and an edge face 11E of the punched shutter blade 11. Finally, in step of FIG. 5(C), the shutter blades 11 are collected and piled up, and the aligned edge faces of the shutter blades 11 are spray-coated by a nozzle 60. This kind of edge face coating technique for the purpose of preventing a side reflection is disclosed, for example, in Japanese Patent Unexamined Publication Nos. 56-70536, 64-57247 and 3-12642.

Figure 6:
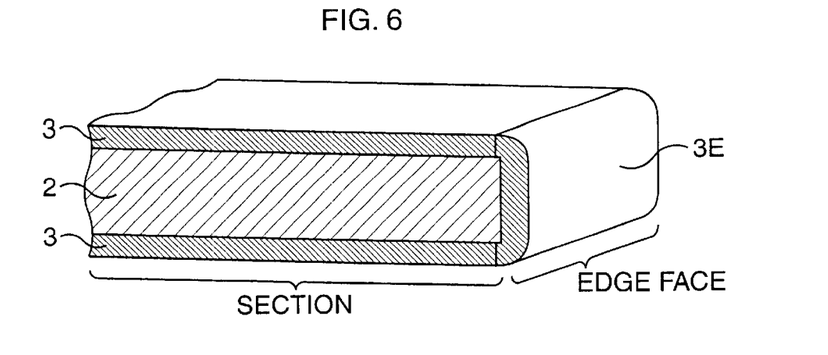
FIG. 6 is a partial cross sectional view, which shows a structure of a conventional light shielding blade.

FIG. 6 is a schematic partial cross sectional view, which shows another example of a conventional light shielding blade. Front and back surfaces of a base piece 2 constituting the light shielding blade are coated with a coating 3 provided with a lubricating performance and a reflection preventing performance. Further, an edge face portion of the light shielding blade is also coated with a coating 3E having a reflection preventing performance. The coating 3E in the edge face portion of this kind is provided for the purpose of preventing a flare phenomenon from being generated due to a reflection of incident light. In addition to the coating, a sand blasting method is known as a method of treating an edge face for the purpose of preventing a reflection.

Figure 7:
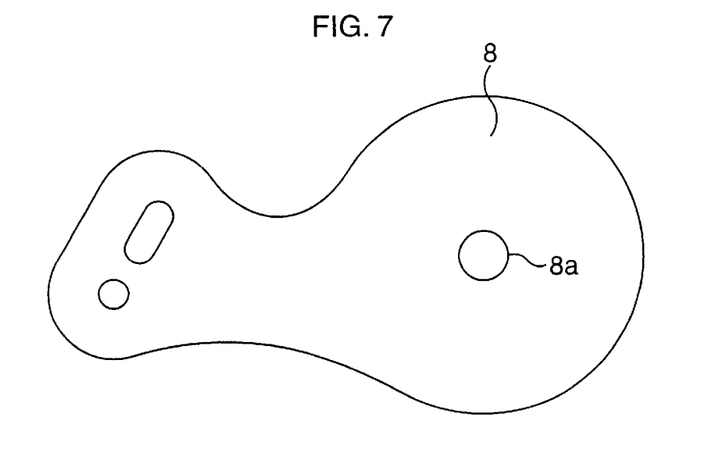
FIG. 7 is a schematic plan view, which shows another light shielding blade in accordance with a conventional art.

As mentioned above, for the purpose of preventing the reflection on the edge face of the light shielding blade, the spray coating has been applied to the edge face portion. This spray coating treatment can be efficiently performed in a state where a multiplicity of shutter blades 11 are piled up as shown in FIG. 5(C). However, among the light shielding blades which are employed for the camera and the like, there is an aperture blade shown in FIG. 7 in addition to the shutter blade. This aperture blade 8 is particularly designed for a digital camera, in which an opening 8a having an inner diameter of 1 to 2 mm is formed in a center portion. Since an optical axis of a lens passes through the opening 8a at a time of exposure operation, it is important to suppress an edge face reflection for preventing the flare phenomenon. However, since the inner diameter of the opening 8a is narrow in a range between 1 and 2 mm, it is impossible to spray-coating the edge faces of the openings 8a in a state of piling up a multiplicity of aperture blades 8.

Figure 8:
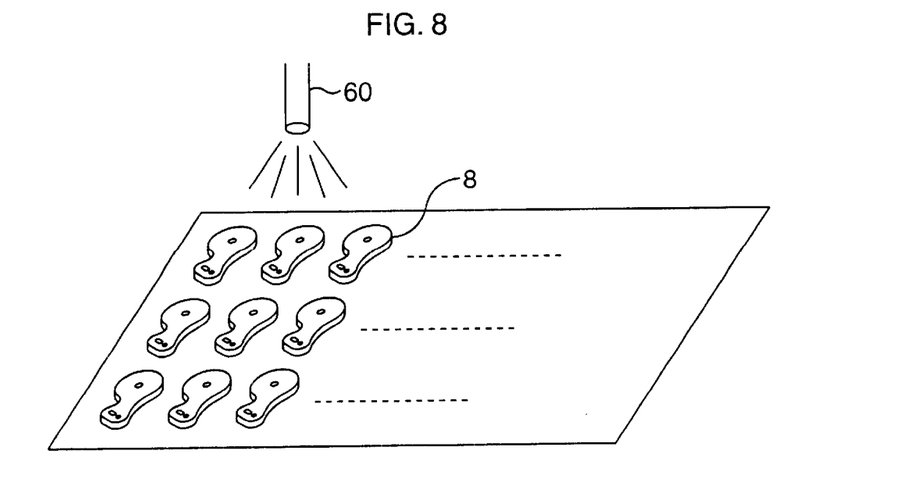
FIG. 8 is a schematic view, which shows a method of processing the light shielding blade shown in FIG. 7.

Accordingly, as shown in FIG. 8, it is necessary to adopt spray coating by means of a nozzle 60 after placing the aperture blades 8 one by one in a flat plane. At this time, since a warp is generated due to a hardening stress of the coating in the case of single face coating, it is impossible to assemble the warped blade 8 in a shutter of the camera. Thus, it is necessary to coat both faces of each blade piece, however, there is a problem that much labor is required to turn over each blade piece and thus a manufacturing cost is increased. Further, in accordance with a compact size of the camera in recent years, the light shielding blade itself tends to be made compact and thin, and the coating in a state of placing the blades in a flat plane as shown in FIG. 8 is difficult. Such handling of blade pieces is not an efficient working method.

In addition, there is a dip method in which a coating is formed by dipping the aperture blades 8 into a resin solution provided with a reflection preventing effect and by pulling up the blades 8 from the resin solution. However, in this dip method, since a thickness of a coating of an inner peripheral edge surface in the opening 8a becomes too great, the method cannot be actually used. Otherwise, it can be considered that a writing brush is employed and a coating material is manually applied to the inner peripheral surface of the opening 8a by the writing brush, however, there is a problem that a thickness thereof is individually fluctuated.

SUMMARY OF THE INVENTION

In order to solve the problems in the prior art mentioned above, there is provided the following means. That is, in accordance with the present invention, there is provided a method of manufacturing a light shielding blade having a major face portion capable of shielding a light and an edge face portion perpendicularly crossing the major face portion by using a base piece which is formed in a predetermined shape from a film material made of a polyester. The method comprises a punching step of punching the base piece from the film material in a predetermined shape, and a chemical etching step of applying a chemical etching onto an edge face portion of the punched base piece so as to roughen the edge face portion, thereby suppressing a light reflection on the edge face portion. In particular, the punching step is performed by punching the base piece in a predetermined shape from a film material provisionally oriented bi-axially and made of a polyethylene terephthalate, and the chemical etching step is performed by dipping the base piece for 5 to 20 minutes into an aqueous solution in which 20 to 50 wt % NaOH or KOH is dissolved and which is heated to 80 to 95° C. In a preferable form, the punching step mentioned above is performed after provisionally forming a coating having at least one of an electric charge preventing effect, a lubricating effect and a frosting effect on a surface of the film material and having a chemical etching resist performance. The coated film material is punched in a predetermined shape to form the base pieces of the blades. Further, in accordance with the present invention, there is provided a light shielding blade having a flat major face portion capable of shielding a light and an edge face portion suppressing a light reflection by using a film material made of a polyester as a base piece, wherein the edge face portion is constituted by a porous surface layer obtained by roughening a cut surface of the base piece having a minute composition. The base piece is made of, for example, a bi-axially oriented polyethylene terephthalate.

It is possible to etch a polyethylene terephthalate (PET) by employing a sodium hydroxide (NaOH) or a potassium hydroxide (KOH). Conventionally, in the case of a PET film material or the like, the chemical etching is mainly used as a surface treatment on a major face in general. For example, this method is employed for a surface treatment (a preliminary treatment) before a bonding or adhesive operation. In accordance with the present invention, in contrast, roughening process of the edge face portion is performed while keeping a smooth state of the flat major face portion of the light shielding blade as it is, by applying a chemical etching to the edge face portion. At a time of roughening by the chemical etching, it is necessary to control a temperature, a concentration and a time of the etching solution to an optimum condition. As a result, it is possible to form pores having a diameter of about some μm and being locally disposed only on a surface layer of the edge face portion. It is possible to suppress a mirror reflection, which would generate a flare phenomenon or the like, by making the edge face portion porous. In this case, by provisionally applying a coating, which is not corroded by an alkaline or which has a low etching speed, to the film material. Thereafter, the film material is punched into a shape of the light shielding blade, and the chemical etching treatment is applied to a cut surface of the punched blade piece. By such a manner, it is possible to roughen only the edge face portion while keeping a smooth state of the flat major face portion. Since the chemical etching is performed by a wet type treatment, not only an outer edge face of the light shielding blade but also an inner edge face such as an opening or the like can be easily roughened by dipping the blade pieces such that the inner edge face may be brought into contact with the etching solution, whereby the desired reflection preventing treatment can be performed. Since the light shielding blade such as the shutter blade, the aperture blade or the like is formed by punching the film or sheet material after provisionally forming the coating on the film surface, the coating can be used as a resist and it is possible to selectively roughen only the cut face which is exposed in accordance with the punching process.

BRIEF DESCRIPTION OF THE DRAWINGS

FIGS. 1(A)trough 1(C) are schematic diagrams which show a method of manufacturing a light shielding blade in accordance with the present invention and a structure of the inventive light shielding blade.

DESCRIPTION OF THE PREFERRED EMBODIMENTS

Figure 1:
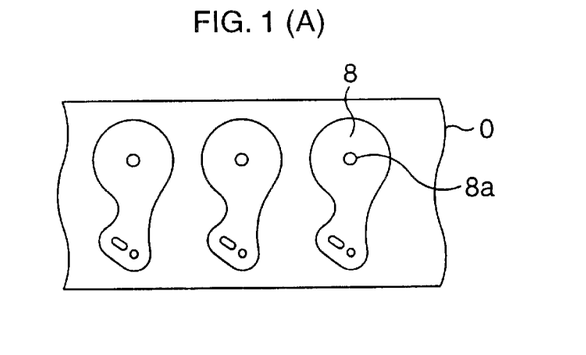

A description will be in detail given below of an embodiment in accordance with the present invention with reference to the accompanying drawings. FIG. 1 is a schematic diagram, which shows a method of manufacturing a light shielding blade in accordance with the present invention. At first, as shown in FIG. 1(A), a coating having at least any one of an electric charge preventing effect, a lubricating effect and a frosting effect and having a chemical etching resistance performance is provisionally formed on a surface of a film material 0. For this coating, an organic material which is not corroded by an alkaline or has a low etching speed such as an urethane, a diallyl phthalate (DAP) or the like is employed. In general, as a component of the coating material used for the surface coating of the light shielding blade, some tens of kinds of materials are mixed such as the resin mentioned above, a reflection preventing agent, a lubricating agent, a black pigment, a dispersion assisting agent, a hardening agent, a thinner and the like. Such a coating material is a so-called functional coating material. The functional coating material of this kind is designed such as to satisfy a lubricating performance, a durability, a reflection preventing performance, an abrasion resisting performance, a solvent resisting performance or the like. On the contrary, for the film material 0 used as a base piece of the light shielding blade, a polyester which is light and excellent in a rigidity is employed. In particular, a bi-axially oriented polyethylene terephthalate is excellent in a rigidity, and therefore is preferable. In some cases, it is possible to employ a polyethylene naphthalate (PEN) for the basic piece of the light shielding blade.

Subsequently, a punching process is performed such that the base piece is punched from the film material 0 in a predetermined shape. In accordance with the present embodiment, as illustrated, the film material 0 is punched, die-cut or press-cut in a shape of the aperture blade 8 provided with an opening 8a having an inner diameter of about 1 to 2 mm at a center thereof.

Subsequently, as shown in FIG. 1(B), a chemical etching is applied to the edge face portion of the punched base piece so as to roughen the cut face, thereby enabling to suppress the light reflection by the edge face portion. Due to the chemical etching, not only the outer edge face of the aperture blade 8 but also the inner edge face of the opening 8a can be simultaneously roughened. In accordance with the present embodiment, in order to make the fabricating operation efficient, a multiplicity of punched aperture blades 8 are bundled by a wire 51 and are dipped into an etching tank 52 which is filled with an etching solution 53. A number of the blades which can be treated at one time is between some hundreds and some thousands of pieces. In accordance with the present embodiment, the blades are dipped in a 30 % KOH aqueous solution maintained at a temperature of 90° C. for ten minutes, and thereafter the blades are washed well. The edge face of the obtained aperture blade 8 shows a state of a minute uneven surface and a frosting outer appearance. The chemical etching process is preferably performed by heating the etching bath to a temperature between 80 and 90° C. and by dipping the punched base pieces in the aqueous solution containing 20 to 50 wt % NaOH or KOH for 5 to 20 minutes. It is necessary to set the temperature of the etching tank 52 to a level equal to or more than 80° C. in order to keep a reaction speed at a practical level, and it is necessary to set the temperature of the etching tank 52 to a level equal to or less than 95° C. since the water is boiled at a temperature equal to or more than 100° C. It is preferable to set the concentration of NaOH or KOH to a level equal to or more than 20 wt % in order to obtain a sufficient reaction speed, and the concentration of NaOH or KOH is controlled to a level equal to or less than 50 wt % in view of the solubility of NaOH or KOH. A treating time is varied in dependence on the temperature and the concentration. Practically, the treatment time may be set to about 5 to 20 minutes. When it is equal to or less than 5 minutes, no roughening result is generated, and when it is equal to or more than 20 minutes, there is a risk that a size of the aperture blade 8 itself is changed over an allowable range during the roughening operation of the edge face portion.

FIG. 1(C) is a schematic partial cross sectional view which shows a structure of a light shielding blade manufactured via the coating step, the punching step and the chemical etching step mentioned above. As illustrated, the present aperture blade 8 is composed of the base piece 2 formed from a film material made of a polyester. The flat major face portion of the blade 8 is capable of shielding the light, and the edge face portion is treated to suppress an ill light reflection. For example, it is possible to obtain a necessary light shielding performance by mixing carbon particles or powders into the base piece 2. The blade is characterized in that the edge face portion is has a rough and porous surface layer obtained by making the cut surface of the base piece 2 having a minute composition. In particular, an infinite number of pores 2h having a diameter of about some $\mu$m are formed on the surface of the edge portion in accordance with the etching process. Further, both of front and back surfaces of the base piece 2 are provisionally coated with the coating 3 provided with an electric charge preventing effect, a lubricating effect and a frosting effect. Since the coating 3 is mainly composed of a resin provided with a chemical etching resistance performance, it is possible to selectively make only the edge face portion of the aperture blade 8 rough in the chemical etching step mentioned above.

Figure 9:
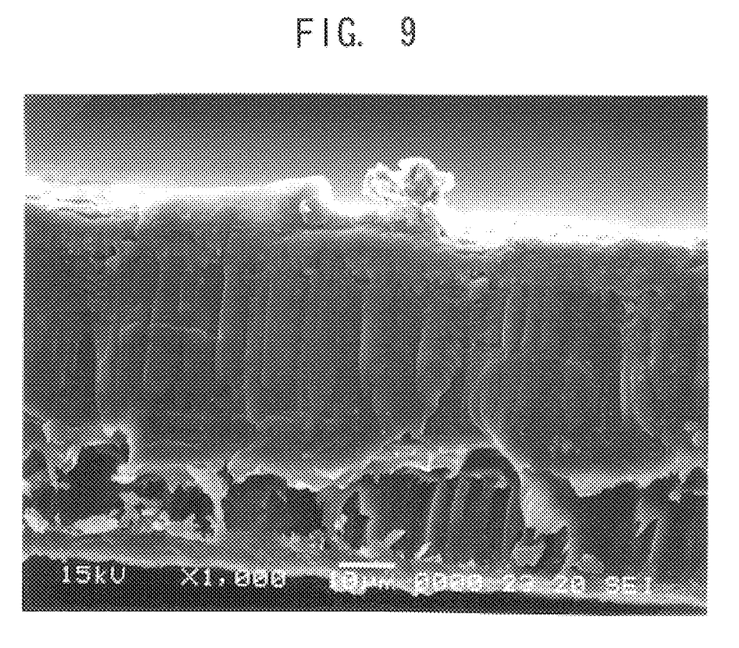
FIG. 9 is a photograph taken by a scanning electron microscope from a cut face of the light shielding blade before a chemical etching treatment.

FIG. 9 is a photograph taken by a scanning electron microscope in a magnifying scale of 1000 from a cut face of the light shielding blade before the chemical etching treatment. As shown in the photograph, the cut face has initially a minute surface structure of the PET resin. The cut face is rather smooth and flat.

Figure 10:
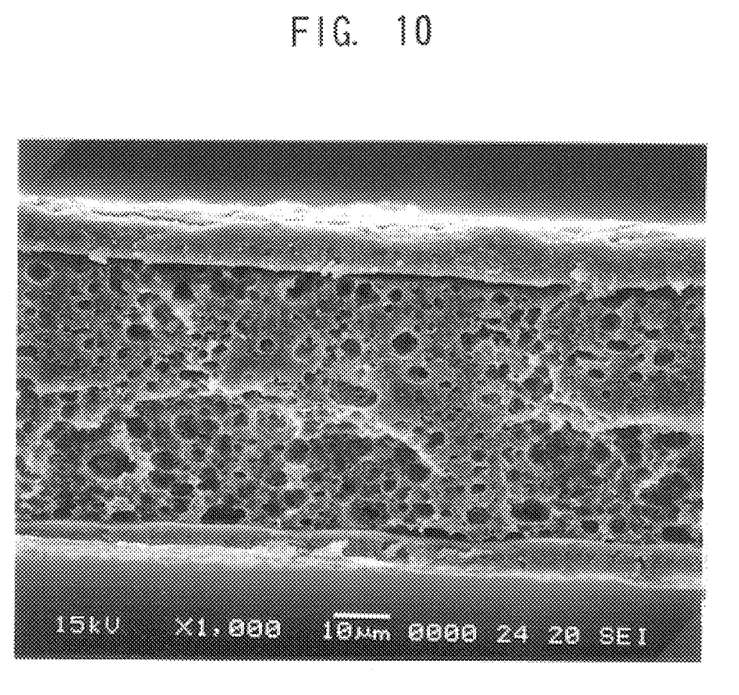
FIG. 10 is a photograph taken by a scanning electron microscope from a cut face of the light shielding blade after a chemical etching treatment.

FIG. 10 is a photograph taken by a scanning electron microscope in a magnifying scale of 1000 from the cut face of the same light shielding blade after the chemical etching treatment. As shown in the photograph, the cut face has a porous surface structure. The chemically treated cut face is rough and uneven.

Figure 2:
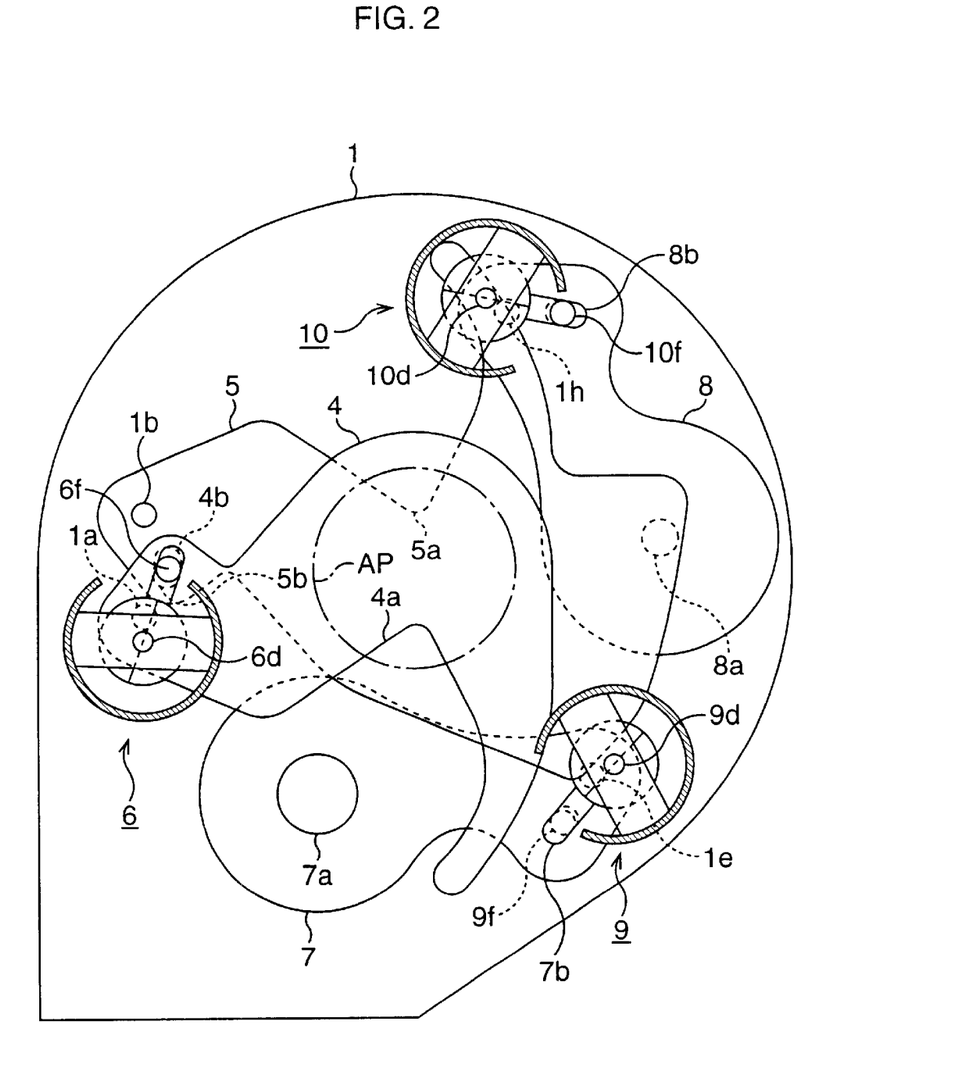
FIG. 2 is a schematic plan view showing an embodiment of a shutter in which a light shielding blade manufactured in accordance with the present invention is assembled.

FIG. 2 is a schematic plan view showing a shutter of a digital still camera in which the aperture blade 8 produced in accordance with the present invention is assembled. In this case, another aperture blade 7 which is produced in the same manner as that of the aperture blade 8 is also assembled in this shutter. The shutter is assembled by using a substrate 1 having an exposure aperture AP for forming an image pickup. An optical path is formed in a center portion of the exposure aperture AP. Reference numerals 4 and 5 denote a pair of shutter blades for opening and closing the exposure aperture AP, which can be manufactured in accordance with the present invention. The shutter blades 4 and 5 are respectively supported by pins 1a and 1b which are provided on a back side of the substrate 1 in such a manner as to enable free pivoting movement of the shutter blades 4 and 5. The shutter blades 4 and 5 respectively have opening ends 4a and 5a for controlling an effective opening area of the exposure aperture AP in correspondence to a pivotal operating position, and are positioned in a state where the exposure aperture AP is shut at a rest or idling time.

Reference numeral 6 denotes a moving magnet actuator for opening and closing the shutter blades 4 and 5. The moving magnet actuator 6 is structured such that a coil frame is adhered to an inner side of a cylindrical casing and a coil is wound along a longitudinal direction of the coil frame. A magnet having two poles are rotatably supported to a rotational shaft 6d provided in an inner side of the coil frame. An output pin 6f which is protruded and formed in an outer side of the magnet is engaged with each of elongated holes 4b and 5b which are respectively formed in the shutter blades 4 and 5 with passing through the substrate 1.

The present embodiment is structured such as to control three kinds of aperture diameters comprising a large diameter, a middle diameter and a small diameter. A full open state of the exposure aperture AP corresponds to the large diameter. Further, the middle diameter and the small diameter can be obtained by respectively moving forward the aperture blades 7 and 8 to the exposure aperture AP. At first, the aperture blade 7 corresponding to the middle diameter is supported to a pin 1e provided in the substrate 1 in such a manner as to allow free pivotal movement, and an aperture 7a corresponding to the middle diameter is formed in the front end portion of the aperture blade 7. Further, reference numeral 9 denotes a moving magnet actuator constituting a drive source for pivotally driving the aperture blade 7, and an output pin 9f of the moving magnet actuator 9 is engaged with an elongated hole 7b formed in the aperture blade 7. Next, the aperture blade 8 corresponding to the small diameter is supported to a pin 1h provided in the substrate 1 in such a manner as to allow free pivotal or swing movement, and the opening 8a corresponding to the small diameter is formed in the front end portion of the aperture blade 8. As mentioned above, the inner edge face of the opening 8a is made rough in accordance with the chemical etching. Reference numeral 10 denotes a moving magnet actuator constituting the drive source for actuating the aperture blade 8. An output pin 10f of the moving magnet actuator 10 is engaged with an elongated hole 8b formed in the aperture blade 8.

An actual photographing is performed by the digital still camera in which the shutter having the structure mentioned above is assembled. When analyzing the quality of the obtained photo image, there is no flare and a good image quality is obtained. When the aperture blade 8 to which the chemical etching process is not applied is assembled in the same camera shutter and the quality of the photo image is analyzed in the same manner. A flare is generated. In particular, a linear light ray generated due to the reflection of the inner edge face of the opening 8a in the aperture blade 8 appears on the image.

Figure 3:
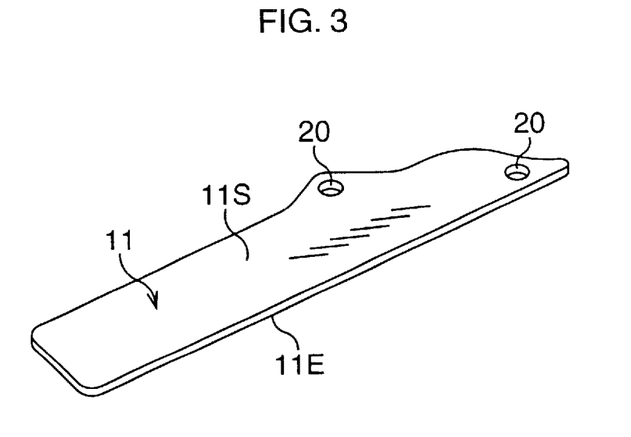
FIG. 3 is a schematic perspective view, which shows another embodiment of a light shielding blade manufactured in accordance with the present invention.

The present invention is effective not only in the treatment of the aperture blade but also effective in a treatment of an edge face of a shutter blade. FIG. 3 shows an embodiment of a focal-plane shutter blade in which the edge face treatment is applied after the blade piece is cut from a film material by pressing. The shutter blade 11 is composed of a film material made of polyester as a base piece. A flat surface portion 11S of the shutter blade is capable of shielding or blocking an incident light, and an edge face portion 11E is treated to suppress an unnecessary light reflection. The edge face portion 11E is made rough in accordance with the chemical etching. The shutter blade 11 has a substantially long shape, and a pair of coupling holes 20 is formed in one end portion of the blade.

Figure 4:
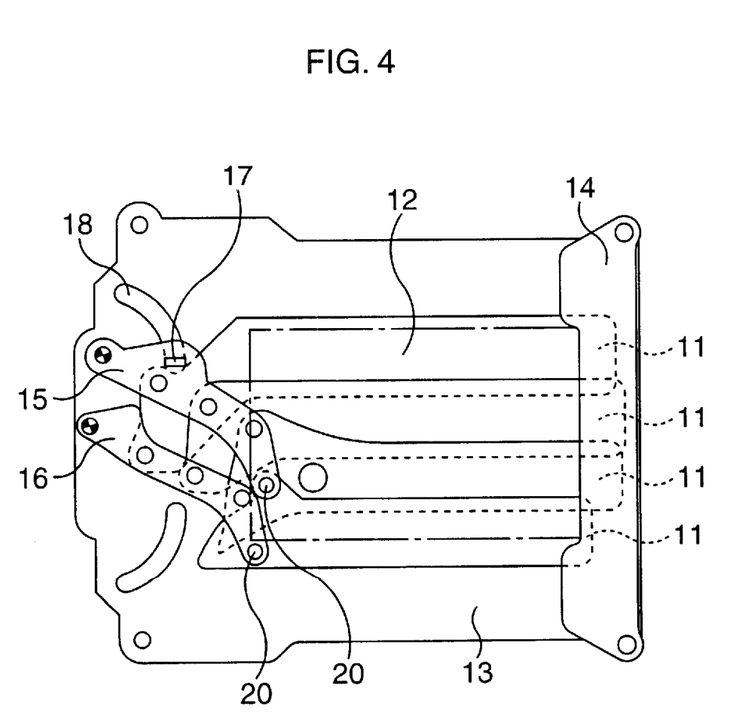
FIG. 4 is a schematic plan view showing a shutter in which the light shielding blade shown in FIG. 3 is assembled.

FIG. 4 shows an embodiment in which the focal-plane shutter blades shown in FIG. 3 are assembled in a focal-plane shutter device of a camera. A rectangular opening 12 (shown by a single dot chain line) is provided in a center portion of a shutter base plate 13. Four front blades 11 partly overlap with each other in a rest state so as to shut the shutter opening 12. Although an illustration is omitted, a group of back blades are arranged under the group of front blades in an overlapping manner. An unnecessary motion of a front end portion of each shutter blade is restricted by a blade cover 14. A pair of arms 15 and 16 is pivotally supported to a left end portion of the base plate 13 in such a manner as to freely rotate while keeping a parallel relation between the arms 15 and 16. Each of the front blades 11 is engaged with the pair of arms 15 and 16 at the front end portion thereof. The group of back blades are also engaged with a pair of arms (not shown) in the same manner. A rectangular hole 17 is provided in the main arm 15, and a long groove 18 is provided in the base plate 13 along a moving path of the rectangular hole 17 in accordance with the rotation of the main arm 15. In this case, although an illustration is omitted, a drive pin which passes through the base plate 13 via the long groove 18 is engaged with the rectangular hole 17. When pressing a shutter release button (not shown), the drive pin moves upward due to an urging force applied along the long groove 18 provided in the base plate 13. This action rotates upward the main arm 15 which is engaged with the drive pin at the rectangular hole 17 and the sub arm 16 which moves in an interlocking manner to the main arm 15. In accordance with the rotation, the front blade 11 vertically moves upward so as to open the shutter opening 12. Next, the group of back blades (not shown) vertically move so as to shut the opening 12, and the exposure operation of camera is finished. Also in this embodiment, since the edge face portion of each of the shutter blades 11 is made rough, no flare phenomenon is generated.

As mentioned above, in accordance with the present invention, the chemical etching is applied to the edge face portion of the punched base piece so as to roughen the edge face portion. In particular, it is very effective to apply the chemical etching to an inner edge face, which forms a fine opening such as an aperture opening of the aperture blade or the like. Since the chemical etching is performed by dipping the light shielding blade subjected to the wet treatment in the solution, a batch treatment of the base pieces can be performed. Further, since the coating is provisionally formed on the major face of the base piece and thereafter the edge face reflection preventing treatment is applied to the punched blade products in accordance with the,chemical etching, the mass production of the blades is established.

What is claimed is:

1. A method of manufacturing a light shielding blade having a major surface portion capable of shielding an incident light and a roughened edge face portion perpendicularly crossing to the flat surface portion by using a base piece formed in a predetermined shape from a film material made of a polyester, the method comprising:

punching said film material to form said base piece with a major surface portion and a smooth edge face portion; and a chemical etching step of applying a chemical etching to said smooth edge face portion of the punched base piece so as to roughen the edge face portion by forming a plurality of pores in said smooth edge face portion, thereby suppressing a reflection of said incident light at the edge face portion wherein said punching step is performed by punching said base piece in a predetermined shape from a film material, which is provisionally oriented bi-axially and which is made of a polyethylene terephthalate, and wherein said chemical etching step is performed by dipping said base piece for 5 to 20 minutes in an aqueous solution, which contains 20 to 50 wt % NaOH or KOH and which is heated to 80 to 90° C.

2. A method of manufacturing a light shielding blade having a major surface portion capable of shielding an incident light and a roughened edge face portion perpendicularly crossing to the flat surface portion by using a base piece formed in a predetermined shape from a film material made of a polyester, the method comprising:

punching said film material to form said base piece with a major surface portion and a smooth edge face portion; and a chemical etching step of applying a chemical etching to said smooth edge face portion of the punched base piece so as to roughen the edge face portion by foming a plurality of pores in said smooth edge face portion, thereby suppressing a reflection of said incident light at the edge face portion wherein said punching step is carried out after provisionally forming a coating on a surface of the film material, said coating having at least one of an electric charge preventing effect, a lubricating effect and a frosting effect and being provided with a resisting performance against chemical etching.

* * * * *